United States Patent Office 3,102,848
Patented Sept. 3, 1963

3,102,848
NUCLEAR FUEL COMPOSITIONS AND METHOD OF MAKING THE SAME
Menahem Merlub-Sobel, Jersey City, N.J., assignor to Curtiss-Wright Corporation, a corporation of Delaware
No Drawing. Filed Nov. 23, 1959, Ser. No. 854,531
1 Claim. (Cl. 204—154.2)

This invention relates to improved fuel compositions for nuclear reactors, and more particularly to mixtures of uranium dioxide with molybdenum or tungsten, in which the components are evenly distributed and intimately mixed on a molecular level, and to the method of making such compositions.

In the prior art of making nuclear fuel compositions, or "fuel elements" as they are frequently termed, it is known to make pellets, cubes, or other shapes of compressed powdered uranium dioxide and powdered metal, such as molybdenum or tungsten. The uranium of which the oxide is made is more or less highly enriched in its content of uranium-235, according to the degree of nuclear activity desired and the amount of the free metal to be mixed with the oxide. Such compositions are useful in providing more efficient retention of fission products by partial alloying between the free metal and the fission products.

However, prior to the present invention it has been necessary to make the compositions of ground uranium dioxide and ground metal, with a resultant limitation on the intimacy of mix and evenness of dispersion of the two components, owing to the relatively large particle size. The smallest practicable size of uranium dioxide powder producible by grinding is of the order of particles of about 1 micron in diameter, and the metal component, such as tungsten or molybdenum, may be in particles as large as —325 mesh.

It is highly desirable that such nuclear fuel compositions be made of particles of the smallest possible size, both in order to secure a greater intimacy of mix and more even dispersion, and also for the added advantage of better dissipation of heat through the free metal component.

It is therefore an object of the present invention to provide a method making nuclear fuel compositions having components of molecular particle size.

It is another object to provide nuclear fuel compositions having components intimately mixed at the molecular level.

A further object of this invention is the provision of nuclear fuel compositions in which both components are simultaneously precipitated from a chemical compound.

The foregoing objects and others ancillary thereto will be readily understood on reading the following specification.

I have found that an intimate mix of uranium dioxide with either tungsten or molybdenum can be made, having particles of molecular size, by reacting a soluble salt of uranium with a soluble salt of either tungsten or molybdenum to form an insoluble salt containing uranium, oxygen, and one of the other two metals, and reducing this compound by a reducing agent which forms a volatile oxide. Examples of such reducing agents are hydrogen, hydrocarbons, or carbon. Uranium dioxide is not reducible by such an agent, whereas both tungsten and molybdenum are reducible by this means. Uranium salts of an acidic oxide, such as uranyl nitrate, for example, are preferred as starting points, although uranium halides or uranyl halides or other salts may be used.

The general equation for the first reaction is as follows:

$$MT + LZO_a \rightarrow \downarrow MZO_a + LT$$

where M is a uranium containing ion, T is the anion of an M salt, Z is either tungsten or molybdenum, $O_a$ is oxygen in the required amount, and L is any ion capable of forming a soluble salt with $ZO_a$ and with T.

The reduction reaction proceeds according to the general equation $$MZO_a + Q \rightarrow MO + Z + J$$

where Q is a reducing agent of the class specified above, and J is one or more volatile oxides. For the purposes of my invention water is considered a volatile oxide. The resultant composition of MO+Z is a combination of particles of molecular size of uranium dioxide with tungsten or molybdenum, intimately mixed and dispersed at the molecular level, and suitable for pressing and sintering by well-known methods to form pellets or other shapes for nuclear fuel elements.

Following are idealized equations for specific nuclear fuel compositions made according to my invention.

Example I $$UO_2(NO_3)_2 + K_2WO_4 \rightarrow \downarrow UO_2WO_4 + 2KNO_3$$
$$UO_2WO_4 + 4H_2 \rightarrow UO_2 + W + 4H_2O$$

Although in this example uranyl nitrate is given as one of the starting compounds, it will be understood that according to the general equation another soluble uranium salt may be used, such as any of the uranium chlorides or sulfates, for example. Similarly, in place of potassium tungstate I may use any soluble tungstate of which the cation forms a soluble salt with the anion of the uranium salt selected, such as ammonium tungstate.

Example II $$UO_2Cl_2 + (NH_4)_2MoO_4 \rightarrow \downarrow UO_2MoO_4 + 2(NH_4)Cl$$
$$UO_2MoO_4 + C \rightarrow UO_2 + Mo + 4CO$$

Equivalents apply in this example as in Example I.

Example III $$UO_2Cl_2 + (NH_4)_2WO_4 \rightarrow \downarrow UO_2WO_4 + 2NH_4Cl$$
$$UO_2WO_4 + 4H_2 \rightarrow UO_2 + W + 4H_2O$$

Again, in place of uranyl chloride I may use any soluble salt of uranium, and instead of ammonium tungstate I may use any soluble tungstate of which the cation forms a soluble salt with the anion of the selected uranium compound.

Example IV $$UO_2(NO_3)_2 + Na_2MoO_4 \rightarrow \downarrow UO_2MoO_4 + 2NaNO_3$$
$$UO_2MoO_4 + CH_4 \rightarrow UO_2 + Mo + CO_2 + 2H_2O$$

The same equivalents apply in this example as in Examples I, II, and III, according to the general equation.

Although in the four specific examples given above only hydrogen, carbon, and methane have been exemplified as reducing agents, higher hydrocarbons may be used. When using carbon, particular care must be taken to provide stoichiometric amounts and to control the reaction, in order that no undesirable carbon residue may remain in the product. It will be understood that in the reduction phase of the process, the reduction reaction is carried out according to well-known techniques, and that it must be at a temperature not less than that required for the complete reduction of tungsten or molybdenum, that is, approximately 1000° F.

It is also apparent that in the idealized equations given above, the insoluble precipitate of the first reaction of each example may not always be a true compound as shown, but may contain hydrates or hydroxides. This does not affect the chemistry of the procedure, since such compounds are reducible by the same agents in the same manner.

It may sometimes be desirable to adjust the proportions of the nuclear fuel compositions to contain more or less uranium dioxide or of the free metal. This can be accomplished by using an overage of one or the other of starting salts, balancing the amount of the overage with a salt which will form an insoluble precipitate of the desired metal and remove the anion in the filtrate. The following equations will exemplify this reaction.

*Example V*

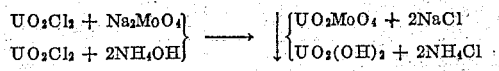

The two precipitates come down together in molecular dispersion, and are treated by a reducing agent as previously discussed, leaving a double proportion of uranium dioxide to free molybdenum.

*Example VI*

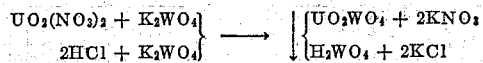

Again, the molecular precipitates come down simultaneously, and are treated with the reducing agent to leave a fuel composition having a double proportion of tungsten to uranium dioxide. It will be obvious that any desired proportion of the two components of the fuel composition can be achieved by adjusting the proportions of the starting salts.

Although I have described my invention above in a preferred form, it will be understood by those skilled in the art that various changes and modifications may be made without departing from the scope of the invention. It is intended to cover all such modifications by the appended claim.

What is claimed is:

The process of making nuclear fuel compositions, comprising reacting an aqueous solution of a first salt selected from the group consisting of uranyl nitrate, uranyl chloride, uranium chloride, and uranium sulfate with an aqueous solution of a second salt selected from the group consisting of ammonium molybdate, potassium molybdate, sodium molybdate, ammonium tungstate, potassium tungstate, and sodium tungstate, each of said second salts having an anion which forms an insoluble precipitate with the cations of the members of said first group, and reducing said precipitate by a reducing agent selected from the group consisting of hydrogen, methane, and carbon at a temperature of at least 1000° F. to form a nuclear fuel composition consisting of uranium dioxide in a molecular mix with the metal of the anion of said selected second salt.

References Cited in the file of this patent

UNITED STATES PATENTS

| 993,270 | Nieske et al. | May 23, 1911 |
| 2,012,825 | Millner et al. | Aug. 27, 1935 |
| 2,848,391 | Fahnoe et al. | Aug. 19, 1958 |
| 2,860,098 | Fahnoe et al. | Nov. 11, 1958 |
| 2,893,859 | Triffleman | July 7, 1959 |
| 2,972,529 | Alexander et al. | Feb. 21, 1961 |
| 3,019,103 | Alexander et al. | Jan. 30, 1962 |

FOREIGN PATENTS

| 788,284 | Great Britain | Dec. 23, 1957 |

OTHER REFERENCES

Peaceful Uses of Atomic Energy, vol. 9, published by the United Nations, 1956, Weber et al., Dispersion Type Fuel Elements, pp. 198 and 199 relied upon.

Nuclear Fuels, published by D. Van Nostrand Co. Inc., 1956, p. 279 relied upon.